United States Patent [19]

Tate

[11] 3,814,924

[45] June 4, 1974

[54] PIPELINE BINARY MULTIPLIER

[75] Inventor: Donald P. Tate, St. Paul, Minn.

[73] Assignee: Control Data Corporation, Minneapolis, Minn.

[22] Filed: Mar. 12, 1973

[21] Appl. No.: 340,633

[52] U.S. Cl. .......... 235/164
[51] Int. Cl. .......... G06f 7/54
[58] Field of Search .......... 235/164

[56] References Cited

UNITED STATES PATENTS

| | | | |
|---|---|---|---|
| 3,508,038 | 4/1970 | Goldschmidt et al. | 235/164 |
| 3,691,359 | 9/1972 | Dell et al. | 235/164 |
| 3,730,425 | 5/1973 | Kindell et al. | 235/164 |

OTHER PUBLICATIONS

C. S. Wallace, "A Suggestion for a Fast Multiplier" IEEE Trans. on Electronic Computers, Feb. 1964 pp. 14–17.

J. E. Partridge, "Cascade Adder for Multiply Operations" IBM Tech. Disclosure Bulletin, Jan. 1971 pp. 2406–2407.

T. G. Hallin et al., "Pipelining of Arithmetic Functions" IEEE Trans. on Computers, Aug. 1972 pp. 880–886.

*Primary Examiner*—Malcolm A. Morrison
*Assistant Examiner*—David H. Malzahn
*Attorney, Agent, or Firm*—William J. McGinnis, Jr.

[57] ABSTRACT

A high speed pipeline multiplier system for a digital computer operates on a continuous stream of operands each having a given number of bits or on a stream of paired operands each operand having one-half the given number of bits. The multiplier system has two sections with a common merge network and if two streams of independent operands are being multiplied, the multiplier system produces independent results.

In either mode of operation, the multiplier operands are divided into a plurality of groups, each group of which is assigned a certain translation value by a decode network. The multiplicand is supplied to the multiplier system during the decoding operation. The translation value assigned to each group of the multiplier operand represents an instruction to gate the multiplicand to a summation device in a certain way. The summation device thus receives a number of partial products equal to the number of groups in the multiplier. This in effect completes the multiplication and the summation device produces the final product by summing the various gated values of the multiplicand. A partial adder tree may be used as the summation device.

When the multiplier system is operating on single operands, the individual operands are split in half and treated as if each half was independent. However, each of the multiplier sections must perform two multiplications with each half operand in order to completely define the product of the regular width operands. That is, the lower half of the full width multiplier must operate on both the upper half and lower half of the full width multiplicand just as the upper half of the full width multiplier must operate on both the upper half and lower half of the full width multiplicand. After these partial products are entered into the summation device, an early carry means is provided so that if a carry is to occur from the lower half of the final full width product to the upper half of the final full width product, this will be recognized in time for the entire final product to be produced at one time with a simultaneous formation of the lower half of the final product and the upper half of the final product with the carry already added.

3 Claims, 5 Drawing Figures

PIPELINE BINARY MULTIPLIER

BACKGROUND OF THE INVENTION

This invention relates to a multiplier for a digital computer and, more specifically, to a dual mode high speed multiplier which may be used in a pipeline computer.

The concept of pipelining in a digital computer has been discussed for several years; however, implementation of all of the hardware elements necessary to produce a practical computer employing a pipelining method is difficult. Pipelining involves the feeding of a continuous stream of operands into a particular arithmetic unit of the computer where the same operation, such as addition or multiplication, is preformed on each operand or pair of operands supplied to the arithmetic unit. In multiplication, the concept requires that a continuous stream of operands, i.e. multipliers and multiplicands, be supplied to two inputs of the multiplier on successive operational cycles of the computer and that a continuous stream of products will result.

It is understood that arithmetic units in a pipelining computer will have several stages of logic required to produce the result and that a second and further additional sets of operands in a stream may be supplied to the arithmetic unit while the first and other successive operands are still in process in the given unit. Thus, a multiplier in a pipelining computer would have a continuous stream of operands supplied to the input while some operands are proceeding through the logic stages of the multiplier to produce a continuous stream of result operands. The various advantages to such a scheme have been well discussed, but one of the principal advantages is that, where a large number of repetitive operations are to be performed, the average time per operation becomes quite short.

Arithmetic units of the type required for a pipelining computer are complex and expensive pieces of equipment since they are designed primarily to have a short operating time cycle for each level of logic so as to increase the rate at which operands may be supplied to the unit. The total result time for any given pair of operands, in the stream of operands, is regarded as of lesser importance. A large and complex computer must be designed to handle relatively wide operands having a large number of binary bits representing numbers with a large number of significant digits. Consequently, in building a pipelining computer of this type, the arithmetic units are disigned to handle the largest numbers which the computer application can conceivably or usefully require. However, it is readily recognized that many routines for which such a computer will be used require substantially fewer significant bits in each operand. In fact, it is found that a useful operand width for such a computer may well be one-half the width required for the maximum width of the desired pipelining unit. Of course, it is obvious that using an arithmetic unit for one-half width operands is inefficient. Because of the cost of such pipelining units, it is not desirable to duplicate pipelining units unless absolutely necessary to increase capacity and it is desirable to get the maximum possible benefit from the least number of elements. Thus, it is desirable to obtain "double duty" from a single relatively wide pipeline.

SUMMARY OF THE INVENTION

The present invention is a high speed multiplier for use in a digital computer. The multiplier may be used for pipeline computation in which new operand pairs are supplied to the multiplier while previous operand pairs are still in the multiplier in the process of forming result operands. The present multiplier may handle multiplication operations in either of two modes. In one mode, the multiplier operates on full-width operands in pipeline fashion to produce single result operands. In the second mode of operation, the multiplier operates in a one-half width mode and receives two independent sets of one-half width operands and produces two independent result operands.

Two multiplier sections, each designed to operate normally on operands of what is here referred to as the one-half width mode are combined with a common merge network in such a fashion that they may be used independently or together. One problem encountered in the full-width mode of operation is that bits in the lower half of the final result operand may produce carries into the upper half of the result operand. For the multiplier to work on a convenient pipeline timing sequence, these lower half carries in the full-width mode must be produced at an early enough time in the sequence so that the entire result operand may be produced simultaneously. This is accomplished by logic associated with the merge network which produces early carry recognition.

The half width sections of the multiplier each operate by decoding the multiplier in a fashion which divides the multiplier into a number of groups. Each group of the multiplier is assigned a translation value according to the value of the bits in the group. In the present embodiment of the invention, the multiplier is divided into two-bit groups and the translation value is determined according to the value of the bits in the group as well as the next lowest bit in the multiplier. One could say in effect that three bit groups are examined, but it is more convenient to determine the groups through identification of the two new unique bits as the groups. The multiplicand is altered according to the translation value determined for each of the groups of the multiplier. Thus, there is a plurality of altered multiplicands which is equla in number to the groups into which the multiplier is divided. All of these altered multiplicands are summed in a particular fashion which gives a weighting value because of the different place value of the different multiplier groups. Of course, the weighting value shifts the multiplicand, in its altered form, the same number of bit positions as the group which determined its translation value.

IN THE FIGURES

FIGS. 2, 3, 4 and 5 represent, in order left to right, a block diagram of the system and should be placed together for better understanding.

DESCRIPTION OF THE PREFERRED EMBODIMENT

Figure 1:
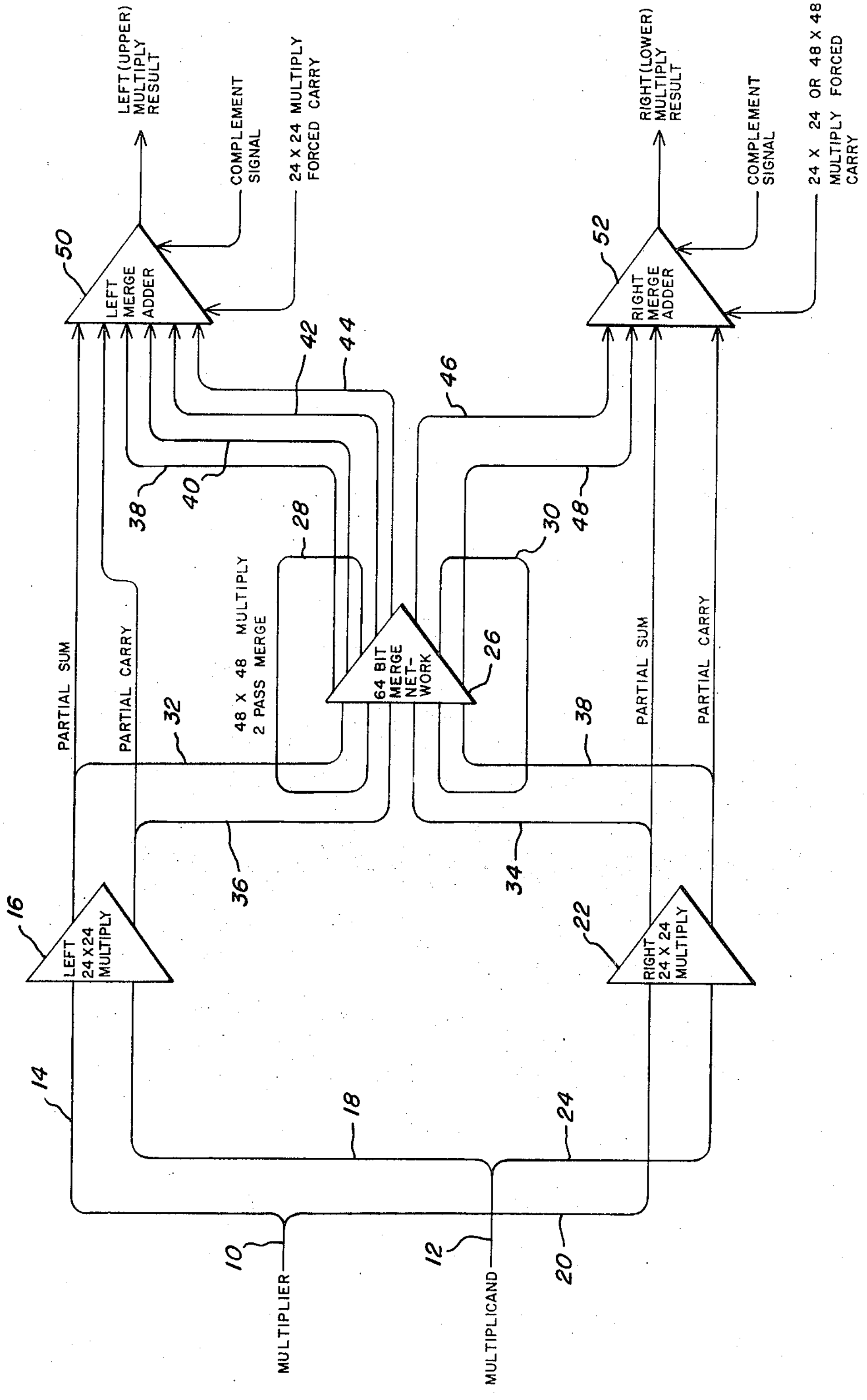
FIG. 1 is a schematic diagram of a multiplier according to the present invention.

Referring now to FIG. 1, a schematic diagram is shown of a multiplier according to the present invention. As shown and described herein, this embodiment is taken as representing an example of a multiplier having a full width operand capacity of 48 bits. Multiplier operands are provided to the multiplier through data trunk 10 and multiplicands through data trunk 12 from portions of a digital computer not shown here. The 48 bit operands are divided into two separate data channels, which for the sake of convenience will be called the left half of the multiplier and the right half of the multiplier. The left and right channels are each 24 bits wide. The left channel receives the upper or leftmost 24 bits of the operands and the right channel receives the rightmost or lower 24 bits of the operands. Data channel 10 for the multiplier operands is divided into data channel 14 for the left half of the multiplier operands and is connected with a left multiply network 16. Similarly, the multiplicand is divided into a left multiplicand channel 18 which is connected in turn to the left multiply network 16. The multiplier operand channel 10 is divided into a right portion 20 which is connected with a right multiply network 22. The multiplicand data path 12 is divided into a right multiplicand data path 24 which is also connected with the right multiply network 22.

Figure 2:
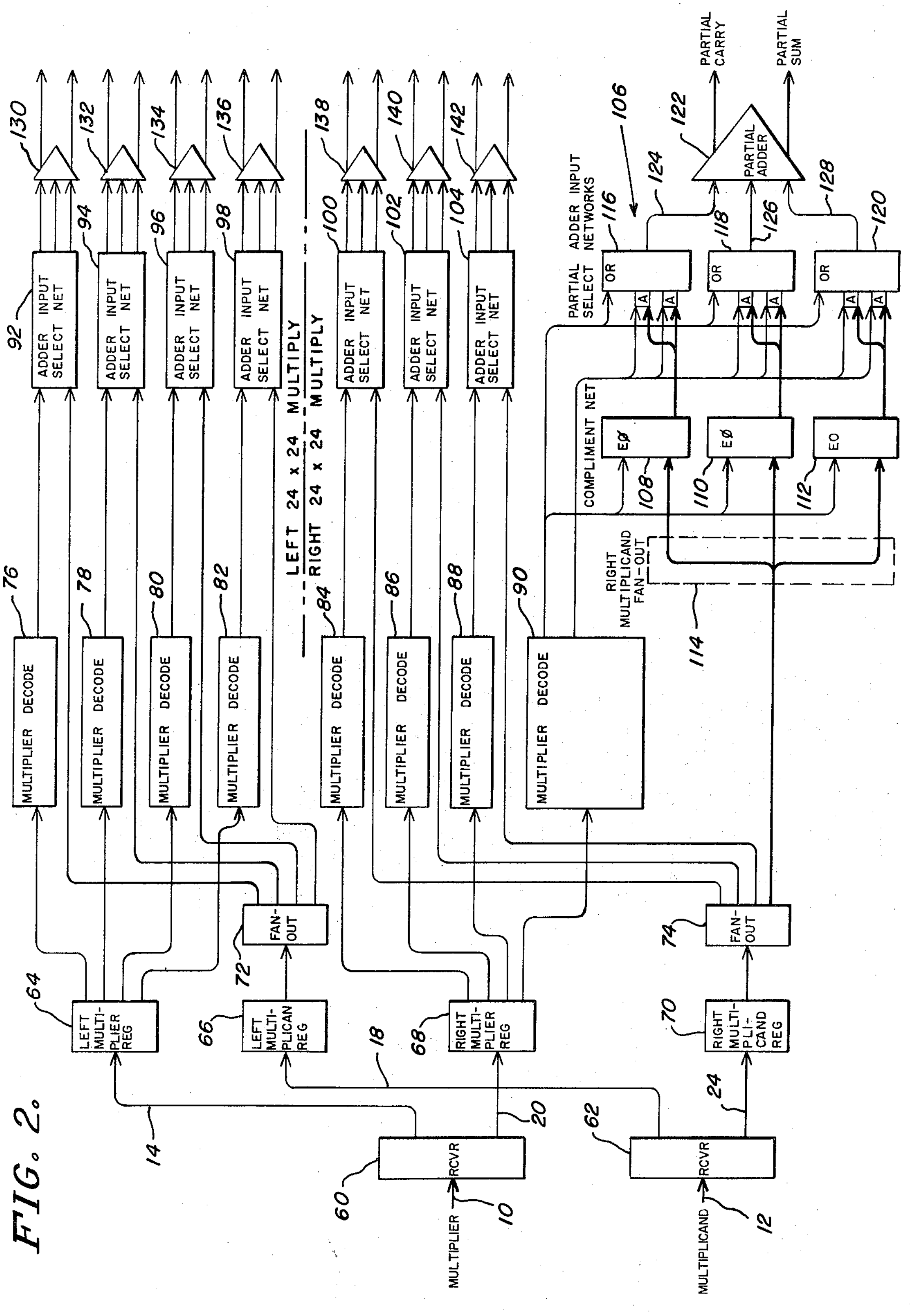
FIG. 2 is a more detailed schematic diagram of the input portion of the multiplier of the present invention as shown in FIG. 1.

Networks 16 and 22 are identical and contain elements shown in greater detail in FIG. 2. These networks produce as the result of an initial addition by a rank of partial adders a plurality of partial sum and partial carry outputs which pass through further additive operations to form the final products. The partial sum and partial carry outputs of both the left multiply network 16 and the right multiply network 22 are supplied to a 64 bit merge network 26 which, when a full width product is being formed, performs a further summing operation and supplies partial carries and sums to full adders 50 and 52.

The basic operation in the 48 × 48 bit multiply is defined by:

$$(A \times 2^{24} + B)(C \times 2^{24} + D) = AC \times 2^{48} + (AD + BC) \times 2^{24} + BD$$

In the first cycle of operation in the 48 × 48 bit mode, the right portion of the multiplier (B) is taken with both portions of the multiplicand and in the second cycle, the left half of the multiplier (A) is taken with both terms of the multiplicand.

As may be appreciated, when two 48 bit operands are being multiplied together, the multiplier must be cycled twice in order to produce all of the required partial products which must be added together to form the final product. The feedback loops 28 and 30 associated with the merge network 26 cycle back the merged partial carries and sums from the first multiply cycle to merge with the partial carries and sums from the second multiply cycle. Partial sum inputs to the merge network 26 are provided by data paths 32 and 34 associated with the left and right halves of the multiplier respectively. Similarly, partial carry data path inputs to the merge network are provided by data path connections 36 and 38 associated with the left and right halves of the multiplier respectively. The output of the merge mertwork 26 consists of left partial sum data path 38, left partial carry data path 40, left group enable data path 42, left group generate path 44, right partial sum data path 46 and, finally, right partial carry data path 48. The outputs of the merge network 26 are connected to a left merge adder 50 and a right merge adder 52. The left merge adder and the right merge adder are also connected respectively to the partial sums and partial carries of the left and right multiply networks respectively.

Figure 3:
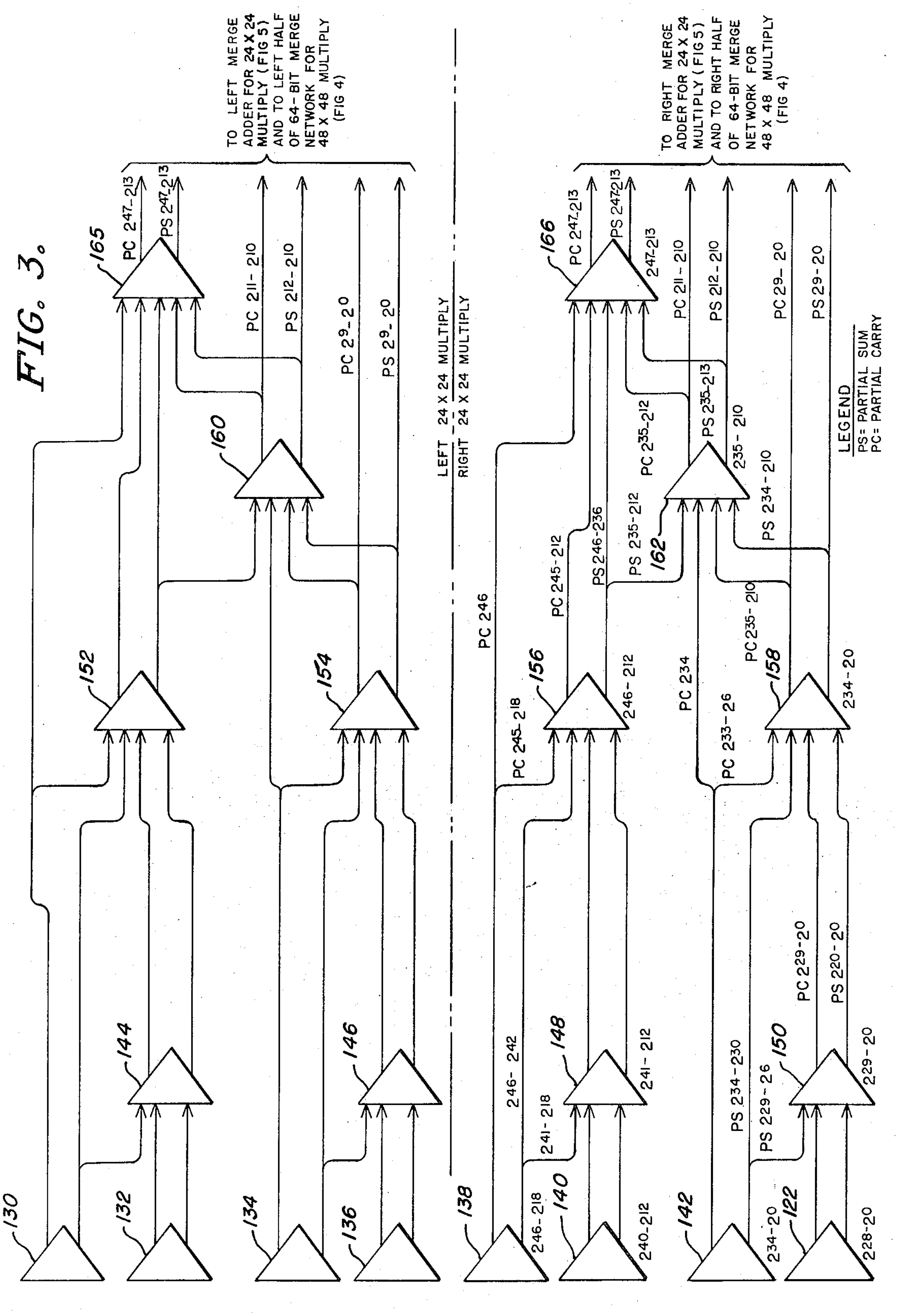
FIG. 3 is a more detailed schematic diagram of another portion following that shown in FIG. 2 of the multiplier according to the present invention as shown in FIG. 1.
Figure 5:
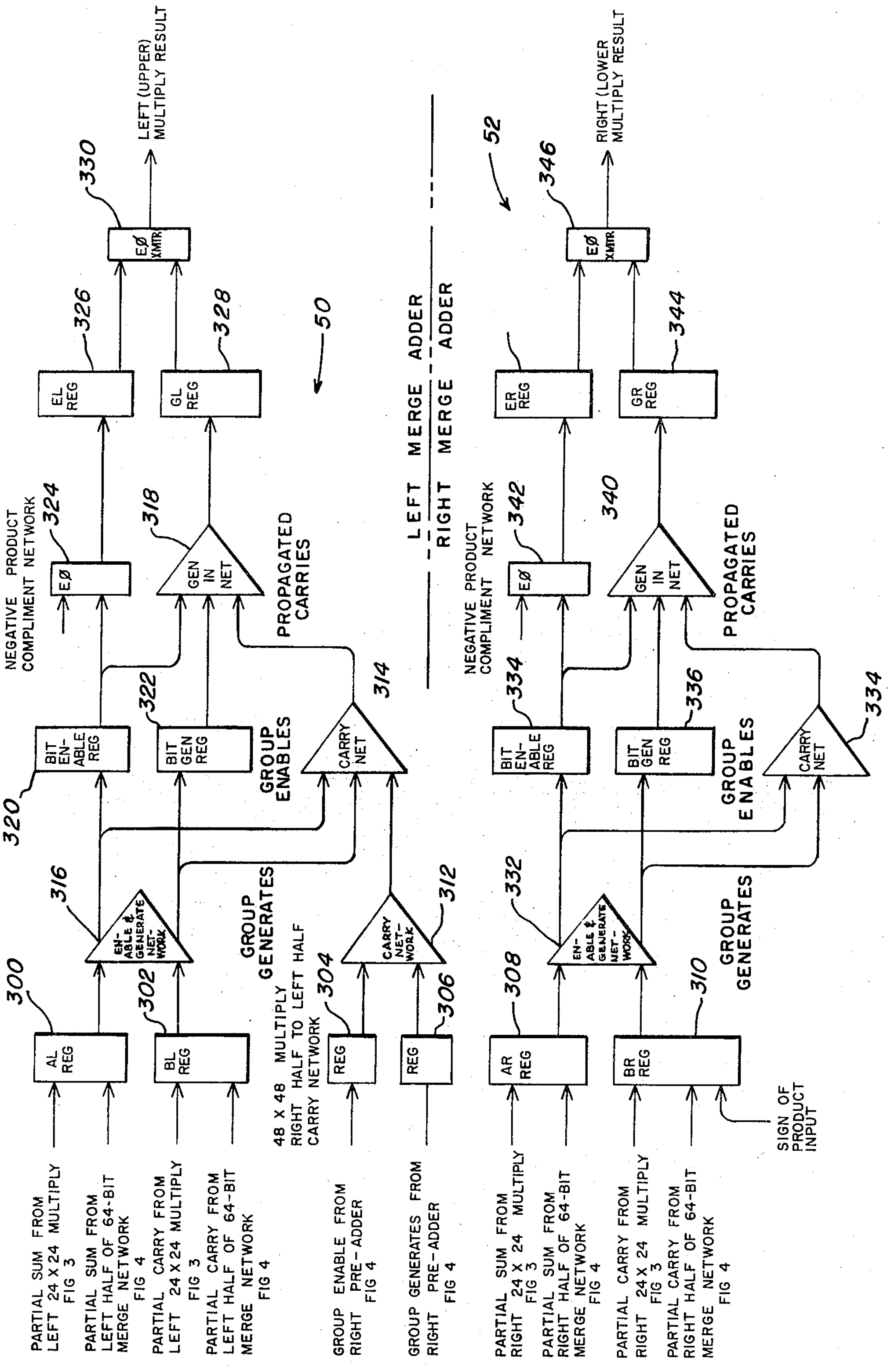
FIG. 5 is a more detailed schematic diagram of the output portion following that shown in FIG. 4 of the multiplier according to the present invention shown in FIG. 1.

As shown in FIG. 1, in dual 24 × 24 bit mode, the partial carries and sums from the left and right multiply networks, 16 and 22 respectively are connected directly to left and right merge adders 50 and 52, respectively. FIGS. 3 and 5 are labeled to make this operation clear.

Referring now to FIG. 2, a detailed schematic diagram is provided of the left multiply network 16 and the right multiply network 22. The multiplier and multiplicands are introduced into receivers 60 and 62 where the 48 bit operands are divided into left and right portions each constituting 24 bits of the 48 bit operands. From receiver 60 and 62 the 24 bit portions of the operands are directed to appropriately labeled registers 64, 66, 68, and 70. The multiplier operands will go to the various portions of the decode network, however, the multiplicands will be required to go to several locations in an additive network and consequently fanout networks 72 and 74 are required for the left and right multiplicands reapectively.

Multipliers are broken into 12 two bit groups by the multiplier decode network. For both the left and right multiply sections, the transfer of the multiplicand, according to the result of the multiplier decode, is made to a first rank of summation devices consisting of partial adders which each receive three inputs and have as outputs a partial carry result and a partial sum result. Referring again to FIG. 2, multiplier decode networks 76, 78, 80 and 82 are associated with the left multiply network and each performs a decode operation of three, two bit groups of the multiplier which will be associated with a given partial adder. Similarly, multiplier decode networks 84, 86, 88 and 90 are associated with the right multiply network. Multiplier decode networks 76 through 90 perform the decode operation according to the schedule of Table I and the actual circuit of the individual multiplier decode networks may be implemented in any of a number of equivalent ways, well known in the art, from analysis of the appropriate circuit equivalents to the boolean logic development of the table.

TABLE I

| $B_{G1}$ | $B_{G0}$ | $B_{(G-1)1}$ | Translation |
|---|---|---|---|
| 0 | 0 | 0 | 0X |
| 0 | 0 | 1 | 1X |
| 0 | 1 | 0 | 1X |
| 0 | 1 | 1 | 2X |
| 1 | 0 | 0 | comp2X |
| 1 | 0 | 1 | comp1X |

TABLE I-Continued

| $B_{G1}$ | $B_{G0}$ | $B_{(G-1)1}$ | Translation |
|---|---|---|---|
| 1 | 1 | 0 | comp1X |
| A | 1 | 1 | 0X |

Groups (G) Numbered 0–11 starting on right
Bits In a group are: $B_{GN}$ N=0 right bit
define $B_{(-1)(1)}=0$ N=1 left bit As a result of the decode operation performed by each of the respective decode networks, an associated adder input select network, designated respectively 92, 94, 96, 98, 100, 102, 104, and 106 gates the appropriate values of the multiplicand to a plurality of partial adders.

Adder input select network 106 is shown in expanded form in FIG. 2, and it is to be understood that adder input select networks 92 through 104 may be organized in a similar fashion. Multiplicands are received as an input by three exclusive OR circuits 108, 110 and 112 associated with the three different decode groups identified by multiplier decode network 90. It is understood that a further fan out device 114 can be used to implement the connection of the multiplicand to the exclusive OR networks. The exclusive OR circuits 108, 110 and 112 are connected with multiplier decode network 90 so that signals can be received which allow the exclusive OR circuits to transfer the multiplicand unchanged or complemented. Thus, the exclusive ORs constitute a complement device. After transfer through the complement device the multiplicand is received by a pair of AND gates associated respectively with OR circuits 116, 118, and 120. The AND gates associated with exclusive OR circuits 116, 118 and 120 are selectively triggered by the multiplier decode network 90 to gate the individual multiplicands in a straight through or a left shifted fashion according to the decode result as shown in Table I. Thus, in each instance one AND gate or the other will be triggered depending upon what the decode table for that portion of the multiplier indicates should be done to the multiplicand. The OR gates 116, 118 and 120, when triggered by the multiplier decode network 90, input partial adder 122 through data channels 124, 126, and 128 respectively with the three altered values of the multiplicand. Just as partial adder 122 is associated with adder input select network 106 and multiplier decode network 90, partial adders 130, 132, 134, 136, 138, 140 and 142 are associated with adder input select networks 92 through 104.

Figure 4:
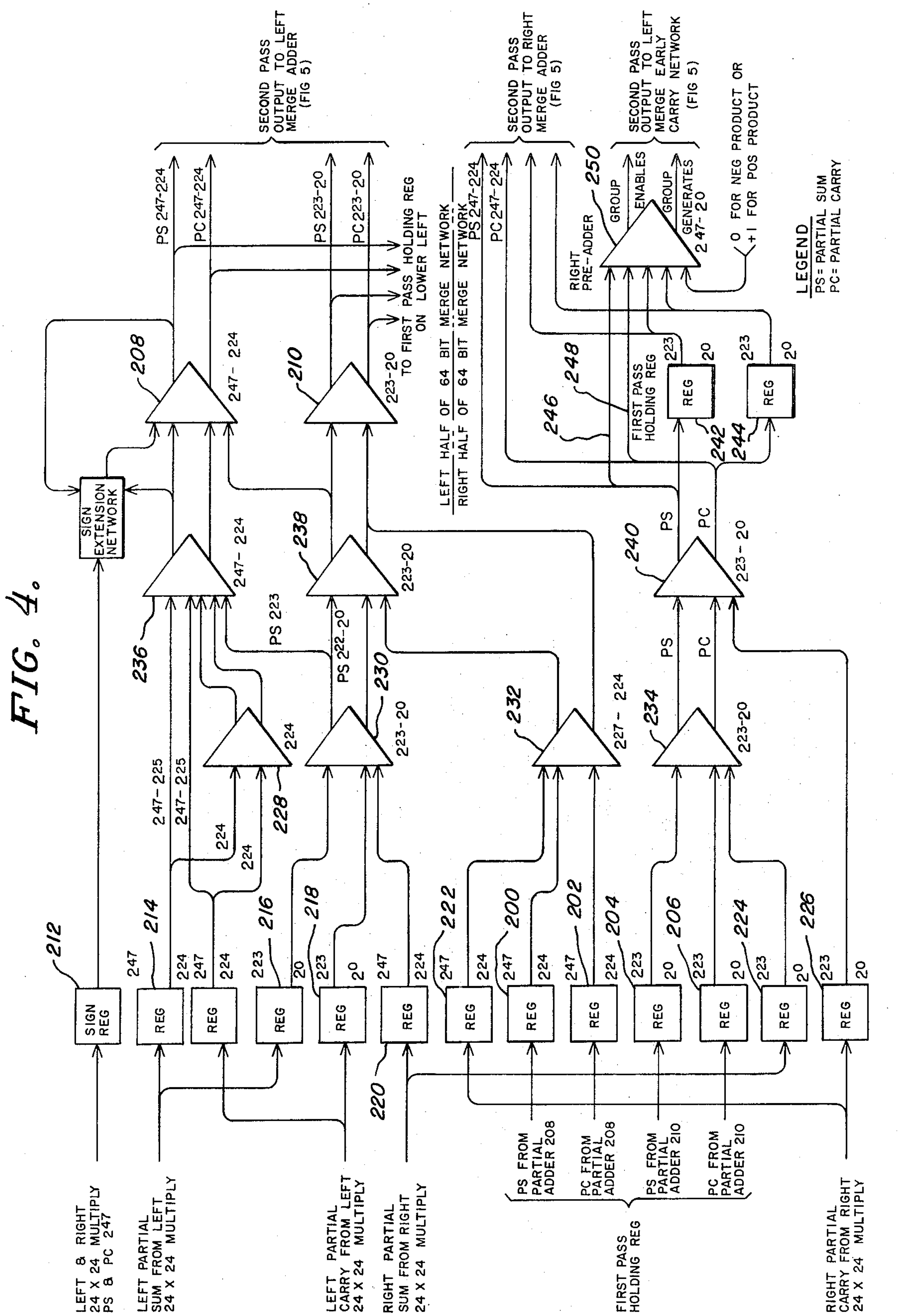
FIG. 4 is a more detailed schematic diagram of yet another portion following that shown in FIG. 3 of the multiplier according to the present invention shown in FIG. 1.

Referring now to FIGS. 3 and 4, further detail is schematically shown of the merge network 26 shown in FIG. 1. FIGS. 3 and 4 should be taken together side by side with FIG. 3 at the left. For simplicity of illustration partial adders 122, 130, 132, 134, 136, 138, 140, and 142 are shown again at the left hand side of the figure. The outputs from partial adders 122, and 130 through 142 are supplied in successive cycles of operation of the computer.

A plurality of partial adders 144, 146, 148, 150, 152, 154, 156, 158, 160, 162, 164 and 166 reduce the partial products gated from the adder input select networks throught the initial rank of partial adders to two 48 bit wide binary numbers for both the left and right multiply channels. The two 48 bit binary numbers in each case are the partial sums and partial carries produced as a result of the partial additions. It may be seen that partial adders 152 through 166 have multiple partial inputs to provide the normal three full width operands because the three input operands in each case are produced by several partial width preceeding stages. The result in each instance is two binary numbers, a partial carry and a partial sum.

The output lines from partial adders 158, 162, and 166 are labeled as to the portion of the 48 bit partial carry and partial sum binary numbers produced thereby to form individual 48 bit wide binary numbers. Similarly, partial adders 154, 160 and 164 associated with the left half of the multiply network are labeled with the components of the individual 48 bit wide partial sum and partial carry numbers produced thereby. The right hand edge of the figure is labeled with respect to the disposition of the numbers produced as a result of the partial adder tree, shown in FIG. 3 for the right and left multiply networks. If the multiplier is operating in a dual 24 bit × 24 bit multiply mode, all that remains is to pass the 48 bit partial sum and partial carry binary numbers to a final adder which will produce the final product. In the computer, this occurs automatically by conventional mechanisms which need not be shown here and the output goes directly to the circuitry shown in FIG. 5 to be described in detail below.

In the case of single 48 bit × 48 bit multiplication, the output of the partial adder trees shown in FIG. 3 is directed to the circuitry of FIG. 4 which accumulates the results from the first pass of the multiplier sections and producing a first half or first cycle partial product until the second cycle partial product is produced and then produces through additional partial adders partial carry and partial sum signals which in turn are suitable for being entered into the circuitry shown in FIG. 5 for producing a final product.

With respect to FIG. 3, the left and right halves of the multiply network are identical. However, on the right half of the network, data path lines are labeled as to the bit values contained therein. For example, partial adder 158 operates on bits from $2^0$ through $2^{34}$ and its output is split with the partial sums and partial carries from $2^0$ through $2^9$ being taken directly as an output to the right hand side of the figure whereas bit values from $2^{10}$ to $2^{34}$ are taken as inputs to partial adder 162.

Similarly, other data path connections and the other partial adders in the right half of the multiply network of FIG. 3 are labeled. Where not labeled, data path connections carry the full width output of the given associated partial adders. Parital carries are designated by the capital letters "PC" and partial sums are designated by the capital letters "PS."

Thus, it will be understood from FIG. 4 that although several of the partial adders, such as partial adder 166 for example, have more than the conventional three inputs, the extra inputs are indicated solely because in the particular summation required for this multiply system, not all of the bits for each individual binary operand are provided from the same source. In reality, only three complete operands are provided to the partial adders. Thus, it is understood from FIG. 3, for example, that a certain portion of the input operands to partial adder 166 is provided from a certain portion of the output operands from partial adder 162 and from the output operands from partial adder 156. In this way it may be appreciated that partial adders each having an individual operand width smaller than the full 48 bit width required to develop the result operand from a 24 bit × 24 bit multiply may be used to build up the result in the fashion as indicated at considerable savings in cost with respect to the individual partial adders.

FIG. 4 which shows in more detail that portion of the 64 bit merge network 26 shown in FIG. 1. The operation of the multiplier according to the present invention will be described in connection with 48 bit × 48 bit multiply operations. As previously explained, in the 48 bit × 48 bit multiply mode, the multiplier must be cycled two times for each operand set in order to develop all of the partial product terms which must be summed together to produce the final product. Referring again to FIG. 4, registers 200, 202, 204 and 206 act as storage registers for the result obtained from a summation of the partial products produced on the first pass through the multiply network when a 48 bit × 48 bit multiply is performed. The results entered into registers 200 through 206 are obtained as indicated on the figure from partial adders 208 and 210. Registers 212, 214, 216, 218, 220, 222, 224 and 226 store results obtained on the first and on the second passes through the multiply network when the multiplier is in the 48 bit × 48 bit mode. Finally, when the result from the second pass through the multiplier in 48 × 48 bit mode is present in registers 212 through 226 and when the result from the first pass through the merge network 26 is present in registers 200 through 206, the summation constituting the second pass through this portion of the merge network occurs wherein the results obtained and stored in the registers undergo a further process of partial summation involving partial adders 228, 230, 232, 234, 236, 238 and 240.

The result obtained in this portion of the merge network are output on a 48 bit wide data path for both the partial sums and partial carries of the lower 48 bits of the 96 bit answer. These partial sums and partial carries must undergo a final summation to produce a final product and a second group of 48 bit wide partial sums and partial carries representing the higher valued bits of the 96 bit partial product must be summed together in a final step to produce a final 96 bit product. It will be appreciated that, where 48 bits of partial carries and partial sums have been generated, representing components of the lower 48 bits of the final product, and 48 bits have been generated, representing the higher order or upper bits of the final product, in order to produce the final product from addition of all of the partial sums and partial carries simultaneously, a means must be provided for ensuring that any additive carry bit generated in the lower 48 bits is transmitted into the upper 48 bits. Obviously, this carry generate cannot be produced at the same time as the lower 48 bits of the final product is completed, as this would not allow for completion of the upper 48 bits of the final product simultaneously therewith. Consequently, registers 242 and 244 store a certain portion of the partial product generated on the first pass through the partial adder sequence so that on the second pass through the merge network the equivalent second pass partial result can be transmitted through data path connections 246 and 248 simultaneously with the contents of registers 242 and 244 to a preadder network 250. The preadder network 250 generates group enables and group generates for the lower 48 bits of the final product which are gated to the final adder section of the multiplier along with the partial product, partial carries and partial sums so that the generation of the upper 48 bits of the final product will have the benefit of carry information produced in addition of the lower 48 bits.

Referring now to FIG. 5, all of the partial sums and partial carries from the right and left multiply networks as well as the group enables and the group generates from the preadder network are entered into registers 300, 302, 304, 306, 308 and 310 in the left merge adder and right merge adder networks corresponding to blocks 50 and 52 of FIG. 1. This is not a requirement or limitation of the invention but is a matter of convenience in illustrating this embodiment as well as implementing it in order to show the results provided to the left merge adders 50 and right merge adders 52 producing final products from partial product, partial carries and partial sums. When the multiplier is being used in a dual 24 bit × 24 bit multiply, there is no input to registers 304 and 306 and consequently there will be no carry generated to interfere with the 48 bit final product.

With respect to right merge adder 52, its operation is independent from that of left merge adder 50 regardless of whether the dual 24 bit × 24 bit mode of operation is employed or the single 48 bit by 48 bit mode since the carry function from the lower 48 bit final product to the upper 48 bit final product is already being handled in the early carry system of the multiplier. Early carry network 312 determined from the group enables and group generates stored in registers 304 and 306 whether or not a one-bit carry signal should be transmitted to carry network 314. Carry network 314 receives the operands from enable and generate network 316 and propagates the appropriate carries forward to network 318.

Registers 320 and 322 store the group enables and group generates while carry network 314 performs the logical function of carry propagation. Carries are propagated at the same time as group enables and group generates are propagated from registers 320 and 322 to exclusive OR network 324 and network 318. Thereafter the operands are transmitted to final registers 326 and 328 which operate in exclusive OR register 330 which generates the final product in the 24 bit × 24 bit multiply operation or the complete 48 bits of the final upper product when a 48 bit by 48 bit multiply is performed.

Right merge adder 52 is identical to left merge adder 50 except that there is no early carry network input into the carry network in the adder. Thus, enable and generate network 332 is similar to enable and generate network 316 and so forth throughout the circuit. Bit enable register 334 and bit generate register 336 store the group generates, group enables while carry network 338 performs the required logical operations to propagate the carries in this portion of the final product to network 340. Exclusive OR network 342 transmits its operands straight through or if appropriately triggered produce the complement operand to produce the complement of the final product if that is required in this mode of operations. Finally, register 342, 344, store the operands required to operate exclusive OR register 346 which produces the final product for the right half of the multiplier when operating in a 24 bit × 24 bit dual mode or the lower half of the 96 bit result final product operand when 48 bit × 48 bit multiplies are performed. Exclusive OR circuits 330 and 346 also act as transmitters in transferring the resulting products to the next stages within the multiplier.

What is claimed is:

1. A pipeline multiplier for a digital computer comprising means for initiating multiplication of a multiplier and multiplicand comprising first and second multiplier sections, each of which generate partial products, a common merge network connected with said first and second multiplier sections, and a first and second adder connected with said first and second multiplier sections respectively and with said merge network, and means for enabling said pipeline multiplier to operate on a continuous stream of operands each having a predetermined number of bits by directing partial products from said multiplier sections through said merge network or on a stream of independent paired operands each having one-half the predetermined number of bits by directing partial products from said multiplier sections to said first and second adders.

2. The multiplier of claim 1 wherein said merge network further comprises:

means for early carry recognition operated by said means for enabling, when operating on a stream of operands each having said predetermined number of bits, said means examining partial products to introduce a carry bit into one of said adders when it is determined that the other of said adders will produce a carry bit.

3. The multiplier of claim 1 wherein said first and second multiply sections each comprise:

means for decoding a multiplier by forming as an output signal the multiplier into a plurality of groups each of which is assigned a translation value according to the group content, means, connected with the output signal of said means for decoding, for altering the multiplicand according to the translation value for each group of the multiplier to simultaneously produce an altered value of the multiplicand for each translation value, and means for transferring all of said altered multiplicands to one of said first and second adders and to said marge network.

* * * * *